Patented Dec. 10, 1935

2,023,459

UNITED STATES PATENT OFFICE 2,023,459

CHEMICAL FEEDER AND PROCESS OF MANUFACTURE

Walter S. Bachman, Los Angeles, Calif.

No Drawing. Application April 27, 1934, Serial No. 722,737

3 Claims. (Cl. 210—28)

This invention relates to a new type of a carrier for available chlorine, more particularly for a new form of calcium hypochlorite to be used for various and sundry purposes, such as treating of water and sewage, bleaching, sterilizing, et cetera.

The utility of calcium hypochlorite known as ordinary bleaching powder, having 35% available chlorine, or as high test bleaching powder, having from 60 to 90% available chlorine, is increased through the present invention which consists in bringing this powdered hypochlorite into forms of bricks, pellets, etcetera, containing a known and definite amount of available chlorine. Heretofore hypochlorites were only available either in powdered or liquid form and each batch had to be weighed or measured before use. With hypochlorite in pellets of a known size it is only necessary to add a definite number, all measuring and weighing being thereby obviated.

I prefer to use in this invention a binder which is slightly soluble so that, as the hypochlorite dissolves, a portion of the binder also passes into solution to expose additional hypochlorite. However, this is not absolutely necessary as insoluble binders can also be used, provided they have a certain amount of porosity to permit the leaching out of the hypochlorite.

The hypochlorite preferably used in this invention is the so-called "high test" bleaching powder, containing a high percentage of available chlorine, although ordinary bleaching powder can also be used effectively.

It is an object of the present invention to provide pellets containing calcium hypochlorite.

Another object of the invention is to provide pellets from which calcium hypochlorite can be leached.

In making up the composition of my invention I have preferably used calcium sulphate as a binder. I carried out my invention in the following manner:

I make up an intimate dry mixture of calcium sulphate, in the form of plaster of Paris, and calcium hypochlorite, preferably in form of high test bleach, and then add sufficient water to hydrate the plaster of Paris so that it forms gypsum ($CaSO_4 \cdot 2H_2O$). The setting of plaster of Paris requires a larger quantity of water than corresponds to the difference between the water content of plaster of Paris and gypsum. It also requires a setting time of from one to five hours. After this I may remove some of the excess water by a low temperature drying operation, preferably by means of warm air, without, however, limiting myself to this particular mode of procedure. In place of plaster of Paris ($2CaSO_4 \cdot H_2O$), the anhydrous sulphate ($CaSO_4$) may be used in which case the setting time is considerably increased. The plaster of Paris or hemihydrate is, however, preferable since owing to its quick setting time, decomposition of the hypochlorite is largely avoided.

In practice, binders other than gypsum can be used such as various types of cements, particularly Sorel cement. These compounds are more insoluble in water than gypsum, but owing to their porosity the hypochlorite can be leached out.

Example 60 pounds of high test bleaching powder containing 65% available chlorine is dry mixed with 30 pounds of plaster of Paris. This dry powder is then transferred into a mixer of the type of a dough mixer where, under agitation, 40 pounds of water are added. The resulting dough-like mass is cut into bricks or pellets of any desired form, allowed to set for approximately two hours and then dried in an air drier. The final dry pellets weighed 110 pounds and contained 35% available chlorine, a loss of less than 1.3% available chlorine.

To secure the best results in pellet formation it is advisable to use more than sufficient water to hydrate the calcium sulfate and, after the sulfate has hydrated, then remove the excess. The excess water causes quick setting of the sulfate so that decomposition of the hypochlorite is kept at a minimum.

In use a pellet of known weight is added to water or aqueous fluids to be used for sterilizing, bleaching, et cetera. The hypochlorite slowly dissolves, being leached out through the porous binder or upon the solution of the binder. In the case of $CaSO_4$ binders, the water dissolves away the binder at about the same rate as the hypochlorite, the solubilities being about the same, although that of the hypochlorite is greater.

If desired, the pellets can be utilized in connection with suitable apparatus, such as those shown in my Patents 1,321,586, 1,435,790, and 1,534,256 to effect the sterilization of a water supply. In this use, the minor flow of water dissolves slowly a quantity of the hypochlorite sufficient to sterilize the major flow of water when the major and minor flows are united. The action takes place substantially without formation of any precipitate or residue and at a constant rate.

The term "pellet" is used as including any size or form of solid, whether in pills, blocks, tubes, briquettes, et cetera, since the pellets can be molded, cast, or otherwise made in any form or size desired.

The rapidity of leaching of the hypochlorite can be controlled by the volume of the aqueous liquid brought into contact with the pellet and also by the porosity of the pellet. The latter can be varied as by aerating the setting mixture prior to pellet formation or by otherwise treating the mixture or pellets to form voids therein.

The proportion of calcium sulfate to plaster of Paris can be varied, depending on strength, porosity and size of pellet. Thus, the plaster of Paris can exceed or be less than the weight of bleach powder used.

The pellets are stable over long periods, the chlorine content remaining practically constant.

I claim:

1. The method of manufacture of stable calcium hypochlorite pellets comprising forming a mixture of hypochlorite and a calcium sulfate, adding more than sufficient water to hydrate said sulfate, permitting said sulfate to hydrate at least partially and then subjecting the mass to rapid dehydration to set the hydrated sulfate and avoid hypochlorite decomposition.

2. A pellet consisting essentially of a mass of calcium hypochlorite particles cemented together by a hydrated calcium sulfate to provide a substantially stable pellet.

3. A pellet consisting essentially of a mass of calcium hypochlorite particles cemented together by a cement material to provide a substantially stable pellet.

WALTER S. BACHMAN.